United States Patent [19] [11] 3,731,001

Fairchild et al. [45] May 1, 1973

[54] MULTIPLE LINE SCANNING SWITCHING SYSTEM

[75] Inventors: David Lee Fairchild, Broomfield; Michael Stephen Lane, Boulder, both of Colo.

[73] Assignee: Bell Telephone Laboratories, Incorporated, Murray Hill, N.J.

[22] Filed: Dec. 30, 1971

[21] Appl. No.: 213,907

[52] U.S. Cl. ..........................179/18 FH, 179/18 FF
[51] Int. Cl. ..........................H04q 3/72, H04q 3/24
[58] Field of Search ......................179/18 FA, 18 FH, 179/18 FF

[56] References Cited

UNITED STATES PATENTS

| | | | |
|---|---|---|---|
| 3,172,958 | 3/1965 | Williford | 179/18 FA |
| 3,377,432 | 4/1968 | Abbott et al. | 179/18 FH |
| 3,576,951 | 4/1971 | Uchida et al. | 179/18 FH |

*Primary Examiner*—William C. Cooper
*Attorney*—R. J. Guenther et al.

[57] ABSTRACT

A switching system arrangement for simultaneously scanning multiple groups of line circuits to locate calling and called stations connected to concurrently scanned ones of the line circuits. A supervisory circuit selectively removes bias voltage from one lead of pairs of bias leads extending to idle and busy ones of the line circuits assigned to the concurrently scanned line circuits to facilitate the identity of a line circuit connected to a calling station. Subsequently, the supervisory circuit removes bias voltage from the pair of bias leads extending to the group of line circuits wherein the line circuit connected to the called station is located. Finally, the switching system interconnects the calling station and the called station through the line circuits identified from the ones of the concurrently scanned line circuits.

13 Claims, 10 Drawing Figures

MULTIPLE LINE SCANNING SWITCHING SYSTEM

BACKGROUND OF THE INVENTION

1. Field of the Invention

This invention concerns switching systems. In particular, it relates to a line supervisory circuit arrangement for identifying calling and called customer stations of a switching system.

2. Description of the Prior Art

There has been an increasing demand in recent years for an electronic private branch exchange switching system that can provide communication services to large PBX customers at attractive rates. The majority of PBX systems that are presently available for use on a large customer's premises are electromechanical type switching systems requiring substantial and expensive installation areas or satellite switching systems requiring partial control by expensive stored program control equipment located at a serving central office.

Electronic switching systems employing a common control circuit have been developed for use by small PBX customers having less than 100 stations. A specific example of such a switching system is the common control PBX switching system set forth by Henry H. Abbott et al., in U.S. Pat. No. 3,377,432 dated Apr. 9, 1968. In the prior art switching system disclosed by Abbott et al. a common control circuit, sometimes referred to as a controller, performs the locating and connecting functions for all customer stations served by the switching system. Thus, when one customer station requests that a connection be established to another station the common control must first sequentially scan the customer stations to locate the customer station requesting service and then must identify the other customer station in order that a connection may be established between both stations.

Although the Abbott patent is a substantial contribution to the PBX electronic switching system technology it must be recognized that a certain amount of common control call processing time is required to perform the scanning and locating functions. During the time interval the common control is identifying the customer station requesting service it is unavailable to handle service requests from other stations. If the number of customer stations is increased to meet the station demands required by a large PBX customer the common control call processing time is increased to such a value that the quality of service provided to other stations may substantially decline.

Accordingly, a need exists in the art for an electronic switching system arranged to locate and identify stations for large PBX customers without an appreciable increase of common control call processing time. A need also exists for an arrangement that may be used with prior art electronic switching systems to locate and identify calling and called customer stations from a large number of stations with a minimum increase in the amount of common control circuitry.

SUMMARY OF THE INVENTION

In the exemplary embodiment of the invention the customer stations of an electronic switching system are individually connected to correspondingly numbered line circuits assigned to a plurality of line scanning groups. The controller of the switching system is arranged to scan concurrently ones of the line circuits assigned to each line scanning group and to interconnect calling and called stations connected to identified ones of the concurrently scanned line circuits.

Line supervisory apparatus coupled to the controller and responsive to one of the concurrently scanned line circuits connected to a calling station selectively removes a voltage signal potential from one conductor of pairs of bias control conductors extending to the line scanning groups wherein the other concurrently scanned line circuits are assigned in order that the controller may identify the calling station.

During the interconnecting sequence the line supervisory apparatus responds to the controller and to dialed digits transmitted from the calling station selectively to remove voltage signal potentials from the pair of bias control conductors extending to the line scanning group wherein the line circuit of the called station is assigned. The line supervisory apparatus thus enables the switching system controller to identify individual line circuits from a number of concurrently scanned line circuits in order that connections may be established from calling stations through the identified line circuits to called stations.

In accordance with one aspect of the invention buffer and coincident gate apparatus, responsive to enabling signals and combinations of input signals, respectively, is utilized to remove voltage signal potentials appearing on each conductor of pairs of bias control conductors individual to the line scanning groups. The potentials appearing on each pair of bias control conductors normally maintain the line circuits assigned to the line scanning group in an idle state.

In accordance with another aspect of the invention logic apparatus, including binary elements, is provided to effect an identity of a calling station connected to one of the concurrently scanned line circuits by removing the voltage signal potential from ones of the bias control conductors extending to the other scanned line circuits. The binary elements, individual to each line scanning group, have first states for indicating idle conditions of the line circuits and for connecting first input signals to ones of the coincident gate apparatus. In addition, each one of the binary elements has a second state for indicating a calling condition of one of the line circuits and is interconnected to lock the other binary elements in their first states and to connect enabling signals to predetermined ones of the buffer gate apparatus.

In accordance with a further aspect of the invention additional logic apparatus is provided to effect an identity of a called station by removing the voltage signal potentials from the pair of bias control conductors extending to the line scanning group wherein the concurrently scanned line circuit connected to the called station is assigned. A lead coupled to the controller is first utilized to connect an enabling signal to the buffer gates. Subsequently, dialing signals generated by a calling station enable logic circuitry selectively to connect to one of the coincident gate apparatus an input signal that operates in combination with input signals generated by the binary elements of the first logic apparatus.

DESCRIPTION OF THE DRAWING

The foregoing objects and advantages, as well as others of the invention, will be more apparent from a description of the drawing, in which.

Figures 1, 9:
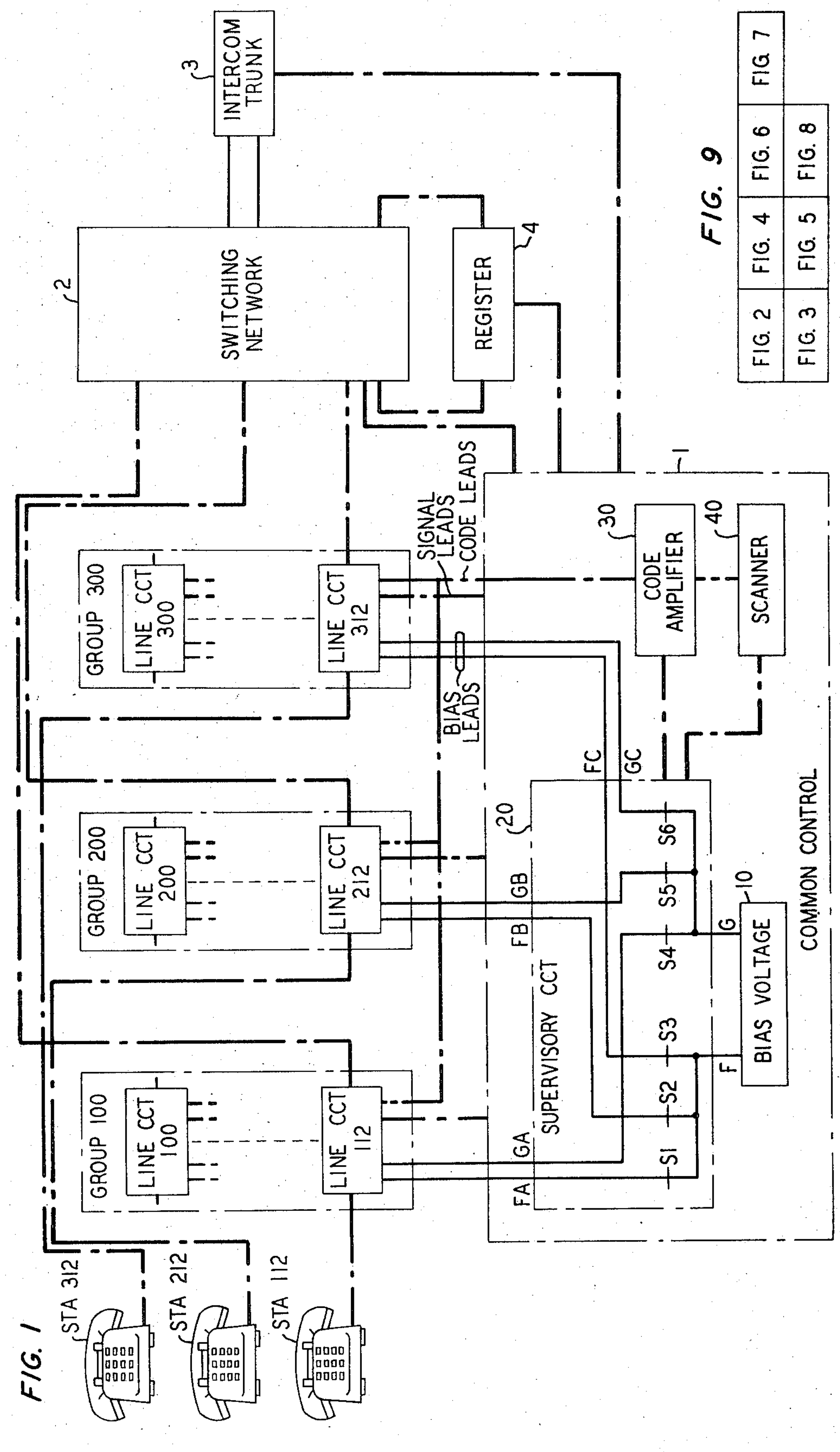
FIG. 1 illustrates an electronic switching system embodying the line supervisory apparatus of the instant invention.

The detailed logic of the circuitry of the instant invention set forth in the drawing is performed by combinations of logic gates, inverters, and flip-flops, the operation and schematic representation of which are well known in the art and are described by J. Millman and H. Taub in the textbook *Pulse, Digital, and Switching Waveforms*, 1965, McGraw-Hill, Inc. The instant embodiment of the invention utilizes NOR gates in the well-known manner as coincident and buffer gates to perform both AND and OR logic functions, respectively. In order to differentiate between these two functions those NOR gates performing AND functions are hereinafter referred to as AND gates and are symbolically shown by the logic symbol of gate FC1 set forth in FIG. 3 of the drawing. Those NOR gates performing OR functions are hereinafter referred to as OR gates and are set forth in the drawing by the logic symbol utilized for gate GC1 of FIG. 3. Where logic symbols are involved, a circle on an input is an indication that a low signal is required to activate the circuit. The absence of a circle is used to indicate that a high signal is required to activate the circuit. The resulting polarity of a circuit output may be determined in the same manner. For example, a high signal on an input of OR gate GC1 or FIG. 3 results in a low signal output.

GENERAL DESCRIPTION

Referring now to FIG. 1 of the drawing, it is intended that telephone stations 112, 212, and 312, shown thereon, be associated with an electronic PBX telephone switching system of the type set forth in the aforementioned patent by H. H. Abbott et al. The present invention is not limited to use with a telephone switching system of this type but may be advantageously utilized with other types of switching systems. It is further intended that each telephone station be connected to an identically numbered line circuit of the switching system that serves the purpose of sensing an off-hook state of a station requesting service, indicating the busy and idle conditions of the station, and connecting the station to various components of the switching system.

In the present embodiment of the invention each line circuit is assigned to a line scanning group identified by the hundreds digit of the line circuit number. Each line circuit located within a particular line scanning group may be identified from the other line circuits of the scanning group by the tens and units digits of the line circuit number. The line circuits of the switching system are, in turn, connected to switching network 2 in order that communication paths may be selectively established through the network to various components of the switching system such as intercom trunk 3 and register 4. Register 4 is connected to both sides of switching network 2 and functions to provide dial tone to a calling station and to count and store successively dialed station number digits. Upon receipt of a dialed station number, register 4 reads out the stored digits into common control 1 in order that a communication path may be established from a calling station through switching network 2 and intercom trunk 3 to the called station. Common control 1 regulates and coordinates the operation of every circuit of the switching system during the serving of call requests and is connected to the line circuits of scanning groups 100, 200, and 300, switching network 2, intercom trunk 3, and register 4.

Common control 1 extends a potential of the proper polarity and magnitude, via a pair of bias control conductors hereinafter referred to as leads to each line circuit of a line scanning group to normally maintain the line circuit in a first state during the on-hook condition of the station connected to the line circuit. In order to illustrate the principles of the present invention these leads are symbolically shown in FIG. 1 of the drawing as F and G leads extending from bias voltage source 10 to supervisory circuit 20, through normally released contacts S1, S2, S3, S4, S5, S6, and leads FA, GA, FB, GB, FC and GC to all line circuits comprising line scanning groups 100, 200, and 300 respectively. Common control 1 further comprises a line circuit scanner 40 having a plurality of operative positions, each of which simultaneously identifies the tens and units digits of the line circuits assigned to the line scanning groups. The output terminals of scanner 40 are connected through code amplifier 30 to code leads that are common to line circuits located in different line scanning groups but that have identical tens and units digits for their line circuit numbers.

A subscriber located at telephone station 112 and desiring to place a call to another subscriber located, for example, at telephone station 312, initiates a service request by removing the handset of station 112 and operating the switchhook. Line circuit 112 detects the off-hook status and transmits a service request indication over signal leads to common control 1. Upon receipt of the service request indication common control 1, as described by the aforementioned Abbott patent, is set to the line dial tone mode thereby causing the tens and units digit information currently recorded by scanner 40 to be gated into code amplifier 30 and over code leads to line scanning groups 100, 200, and 300. If the tens and units digit information appearing on the code leads do not match the tens and units digit of calling line circuit 112, common control then starts scanner 40 to advance until tens digit 1 and units digit 2 appear on the code lead output of code amplifier 30. The code lead tens digit 1 and units digit 2 information operates in combination with the off-hook status of calling station 112 to enable line circuit 112 to signal common control 1 that the line circuits wherein the calling line circuit is located is being scanned. Common control 1 responds by inhibiting further operation of scanner 40 and by enabling supervisory circuit 20 to remove the bias voltage appearing on the G lead extending to line scanning group 200 and 300 by opening the symbolic contacts S5 and S6 located in bias leads GB and GC. The removal of the bias voltage from leads GB and GC prevents telephone stations 212 and 312 from placing their respective line circuits in the off-hook condition and thereby allows common control 1 to identify the line circuit connected to calling station 112 from the three concurrently scanned line circuits.

Once, line circuit 112 has been located common control 1, in the well-known manner set forth in the aforementioned patent by Abbott et al., establishes a dialing connection extending from station 112 through line circuit 112 and switching network 2 to register 4. Upon completion of this task common control 1 releases and becomes available to perform other functions within the switching system. The subscriber, located at station 112 and hearing dial tone, dials the digits of the called station number 312 into register 4. After the dialed digits have been recorded and stored register 4 initiates a read register request to common control 1. Common control 1 responds to the register request by entering a read register mode and enabling supervisory circuit 20 to open symbolic contacts S4, S5, and S6 and remove the bias voltage on leads GA, GB, and GC. The removal of the bias voltage from these leads at this time prevents the line circuits of line scanning groups 100, 200, and 300 from requesting the services of common control 1 during the read resister mode.

Register 4 reads the stored digits 312 of the called station into the input of code amplifier 30, which in turn, places the tens digit 1 and the units digit 2 on the common code leads extending to line circuits 112, 212, and 312. The hundred digit 3 is utilized by code amplifier 30 to direct supervisory circuit 20 to open symbolic contact S3 and remove the bias voltage on lead FC extending to all of the line circuits located in line scanning group 300. Previously the removal of the bias voltage from leads GA, GB, and GC enabled the bias voltage appearing on leads FA, FB, and FC to prevent idle and busy line circuits from obtaining access to common control 1. Thus, the tens digit 1 and the units digit 2 information appearing on the code leads have no affect on busy line circuit 112 and idle line circuit 212. However, the removal of the bias voltage from lead FC acts in combination with the code lead information to enable common control 1 to select called line circuit 312. If the called line circuit 212 is idle, common control 1, in the well-known manner establishes a connection from called station 312, through line circuit 312 and switching network 2, to a first appearance of intercom trunk 3.

After the establishment of this connection common control 1 enables supervisory circuit 20 to release symbolic contacts S3, S4, S5, and S6 in order that the bias voltages appearing on the F and G leads may be extended through the GA, GB, GC, FA, FB, and FC leads to all line circuits. In addition, common control 1 directs register 4 to call back calling line circuit 112 and enables scanner 40 to place tens and units digit information on the input of code amplifier 30. The call back information, in combination with the bias voltage appearing on lead FA places calling line circuit 112 under control of the tens and units information appearing on the code leads extending from code amplifier 30. If the tens and units information appearing on the code leads is other than tens digit 1 and units digit 2 scanner 40 will start and continue to scan until calling line circuit 112 is scanned. When calling line circuit 112 is scanned supervisory circuit 20 operates contacts S5 and S6 and removes the bias voltage appearing on leads GB and GC to allow common control 1 to identify calling line circuit 112. Upon identification of line circuit 112, common control 1 in the well-known manner establishes a connection between calling station 112, through line circuit 112 and switching network 2, and a second appearance of intercom trunk 3. Common control 1 then releases from the connection between calling station 112 and called station 312 and enables supervisory circuit 20 to close symbolic contacts, S5, and S6 and connect the bias voltage on lead G to the GB and GC leads.

In summary, common control 1 of the present embodiment of the invention employs supervisory circuitry to selectively control line circuit bias voltages in order that line circuits connected to calling and called stations may be identified in a group of concurrently scanned line circuits.

DETAILED DESCRIPTION

1. Dial Tone Request

Figure 2:
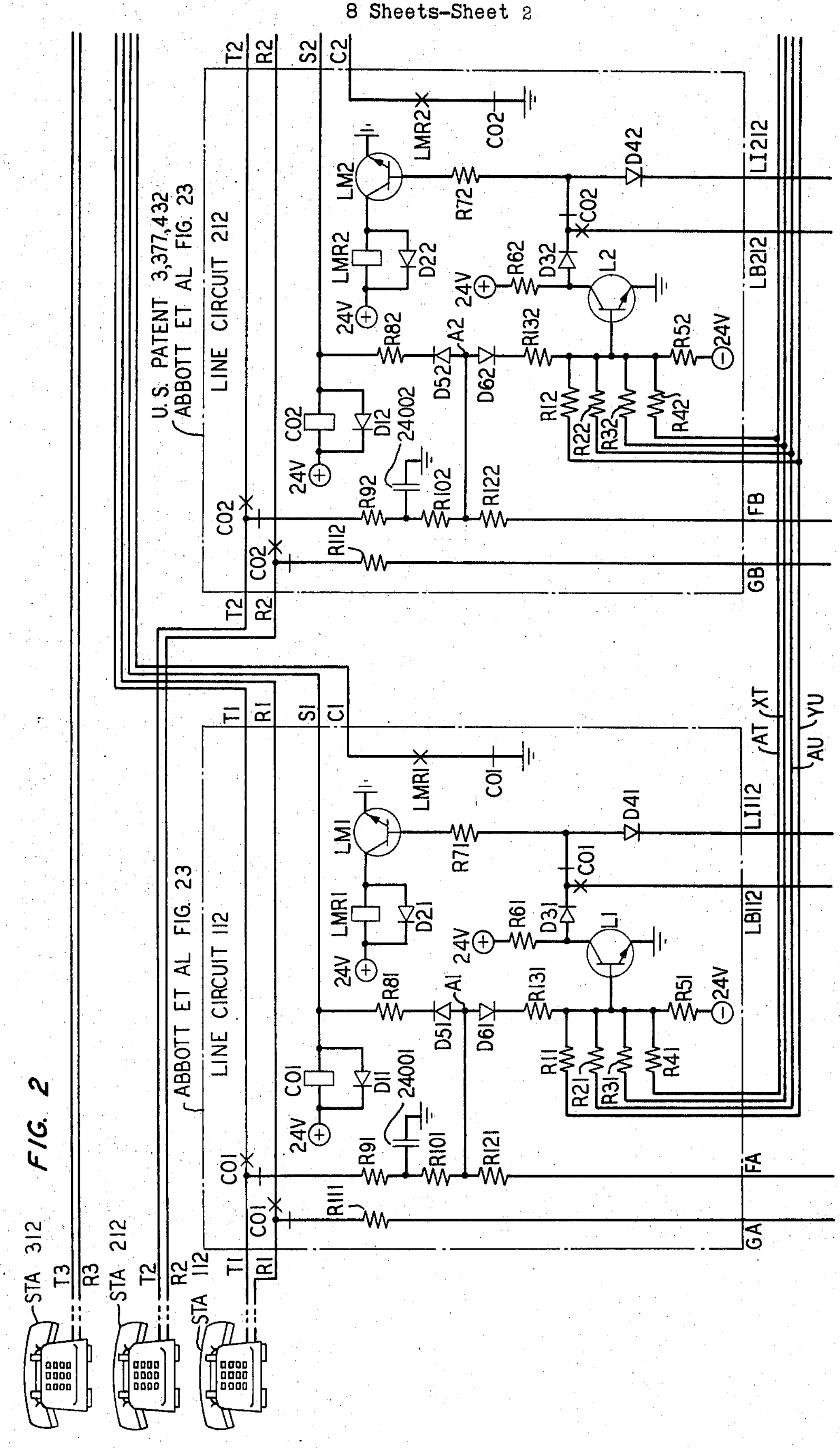
FIGS. 2 and 4, when arranged in accordance with FIG. 9, set forth the circuit details of concurrently scanned line circuits.
Figure 4:
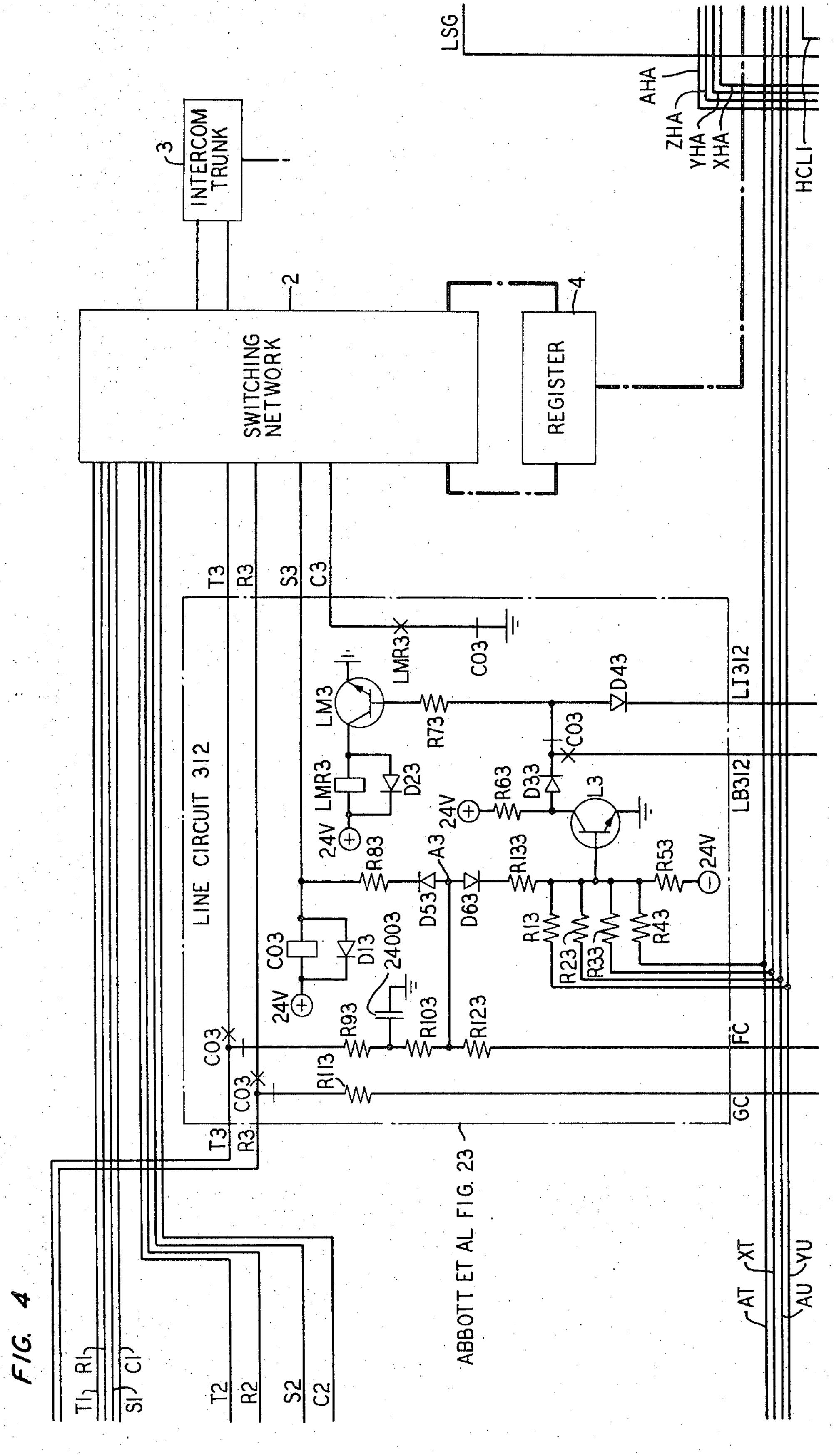

Referring now to FIGS. 2 and 4 of the drawing, it is intended that each line circuit of the switching system be assigned to a line scanning group defined by the hundreds digit of the line circuit number. Each line circuit is identical to every other line circuit and is individually comprised of a cutoff relay CO-, two transistors L- and LM-, a relay LMR-, as well as additional circuit elements such as resistors, capacitors, and diodes as shown.

The line circuits are connected over a pair of tip and ring conductors, designated T- and R-, to a correspondingly numbered station of the switching system. Each line circuit is also connected by signaling conductors S- and C- to switching network 2 and is arranged to extend the T- and R- conductors through switching network 2 to interconnect with other line circuits.

Figure 3:
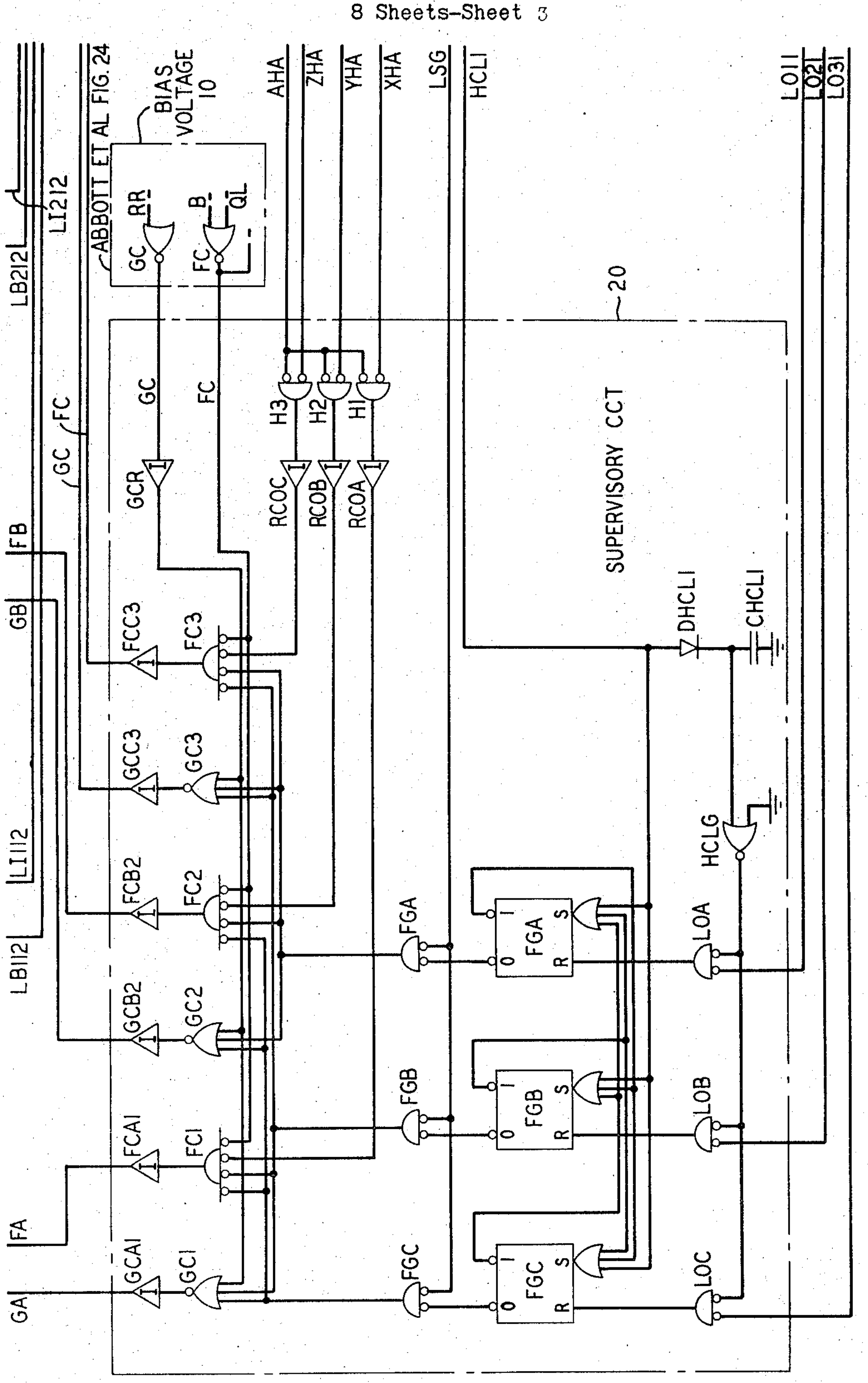
FIG. 3 sets forth the circuit details of the line supervisory apparatus.

Each line circuit is further connected by two signal leads, LB- and LI-, to common control 1 set forth in FIGS. 3, 5, 6, 7, and 8 of the drawing. Common control 1, in accordance with the present embodiment of our invention, is arranged so that supervisory circuit 20, FIG. 3, is connected by common bias leads GA and FA to all of the line circuits assigned to line scanning group 100. Similarly, bias leads GB and FB, in combination with bias leads GC and FC, interconnect supervisory circuit 20 with all of the line circuits assigned to line scanning groups 200 and 300, respectively. When common control 1 is in the idle state, AND gates FC1, FC2, and FC3, along with OR gates GC1, GC2, and GC3, are held in the inhibit state. The resulting high outputs of OR gates GC1, GC2, and GC3 are inverted by connecting inverters GCA1, GCB2, and GCC3 into low bias signals that appear on leads GA, GB, and GC. The low outputs of inhibited AND gates FC1, FC2, and FC3 are inverted into high bias signals by inverters FCA1, FCB2, and FCC3, respectively, and applied to bias leads FA, FB, and FC.

Figure 6:
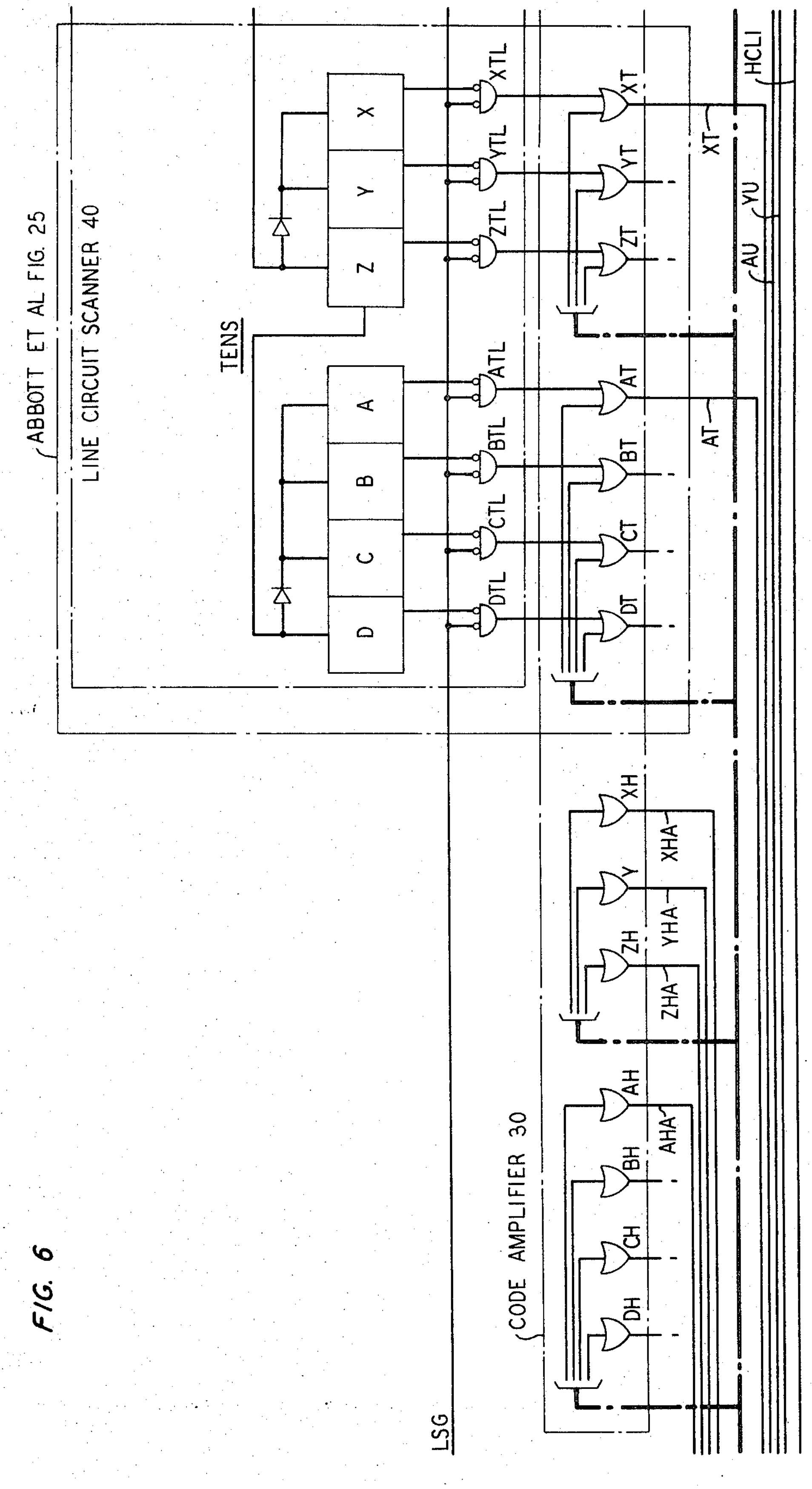
Figures 7, 10:
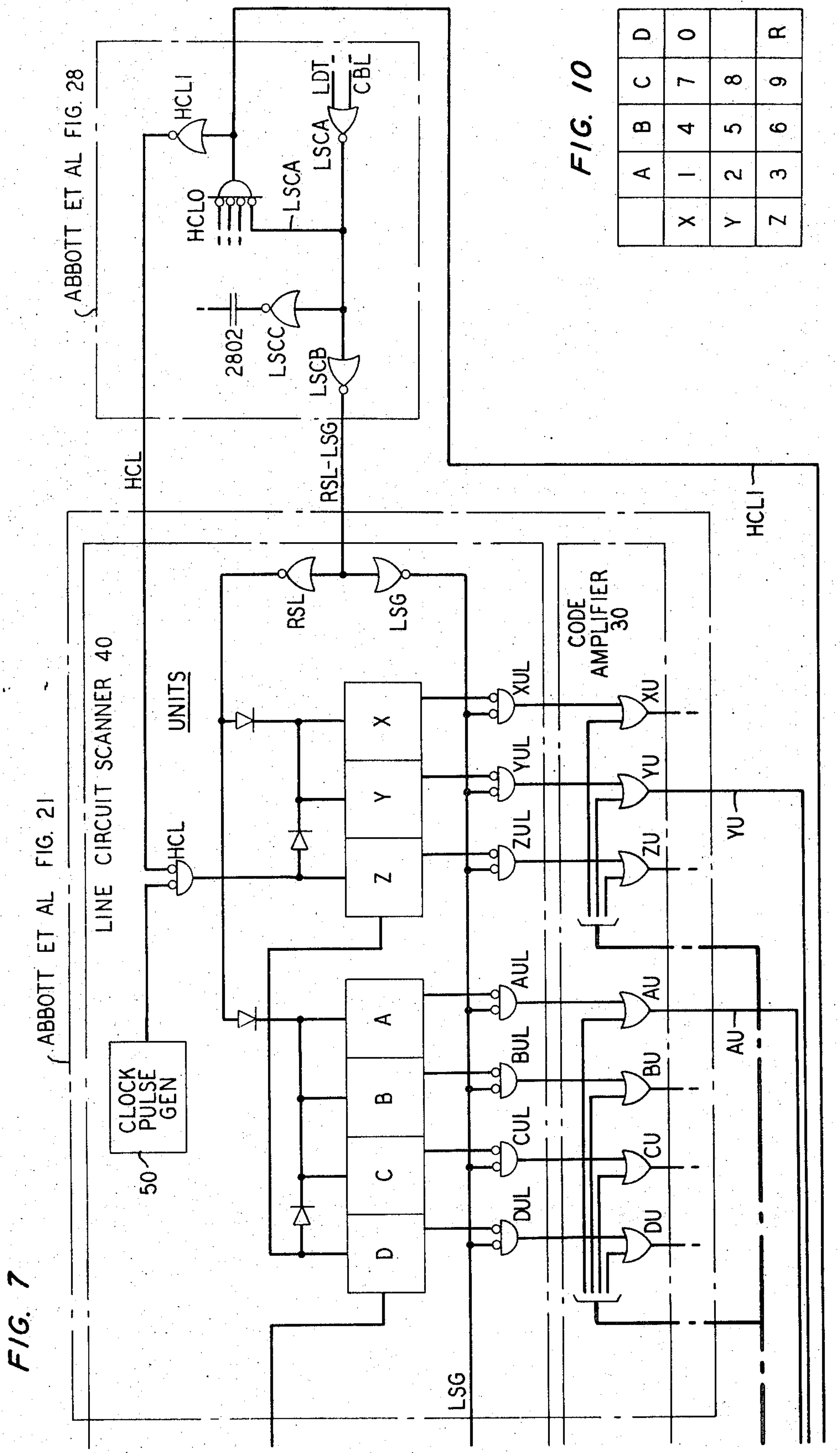
FIG. 10 depicts a table of the code format utilized for digit information employed by the switching system.

Common control 1 comprises in part, a line circuit scanner, FIGS. 6 and 7, having a plurality of operative positions, each of which has an output terminal. The line circuit scanner, described in detail in the aforementioned patent by Abbott et al, includes first XYZ and ABCD operative positions designated as a units digit counter. The units digit counter is, in turn, serially connected to second XYZ and ABCD positions designated a tens digit counter. Operation of the line circuit scanner is such that each tens and units digit is represented by two high signals, one appearing at an output terminal of the XYZ positions and one at an output terminal of the ABCD positions, in accordance with the table format illustrated in FIG. 10 of the drawing.

The output terminals of the line circuit scanner positions, are connected through AND logic gates to inputs of noninverting OR gates comprising the tens and units digit sections of code amplifier 30. Similarly, hundreds, tens, and units digit storing locations of register 4 are connected to inputs of individual hundreds, tens, and units noninverting logic gates in accordance with the two-out-of-seven code format set forth in FIG. 10. The outputs of the tens and units noninverting OR gates are connected to code leads and are extended on a unique coded basis to each of the line circuits. Each line circuit assigned to a specific line scanning group is connected to four of the code leads that identify the tens and units digits of the line circuit number. For example, line circuit 112, FIGS. 2 and 4, assigned to line scanning group 100 is identified therein by tens digit 1 and units digit 2. In accordance with the code format detailed in FIG. 10, line circuit 112 is connected to tens code leads XT and AT and to units code leads YU and AU. Line circuits 212 and 312 are also identified in their respective line scanning groups 200 and 300 by tens digit 1 and units digit 2 and are also connected to code leads XT, AT, YU, and AU. When common control 10is in the idle state low signals appear on all code leads.

Referring now to line circuit 112 of FIG. 2 the high signal appearing on bias lead FA is extended through resistors R121, R101, and R91 and break contacts of relay CO1 to conductor T1 extending to station 112. The high signal is additionally extended through diode D61 and resistor R131 to the base of transtor L1. This positive potential on the base of L1 forward biases the transistor, thereby maintaining it in an ON condition during which the collector is held at essentially the low signal potential of ground. The low signal applied to bias lead GA is extended through resistor R111 and break contacts of relay CO1 over conductor R1 to station 112. The station presents a high D-C impedance when in its on-hook condition, and therefore, the low signal on conductor R1 is of no effect at this time. Thus, in the idle state the L- transistor of every line circuit is turned ON and the high and low bias signals are extended to the stations connected to the line circuits.

2. Dial Tone Request

A subscriber located at station 112, FIG. 2, and desiring to place a call to station 312 lifts the handset of station 112. This closes the switchhook contacts of calling station 112 and places a low D-C shunt across conductors T1 and R1. This low resistance shunt completes a D-C path between the high signal on lead FA and the low signal on lead GA thereby lowering the potential at terminal A1 and turning transistor L1 OFF. The turn-off of transistor L1 raises the potential on its collector from a low signal to a high signal. This high signal is applied through diode D31, break contacts of relay CO1, diode D41 and over signal lead LI112 as a service requist to common control 1.

Figure 5:
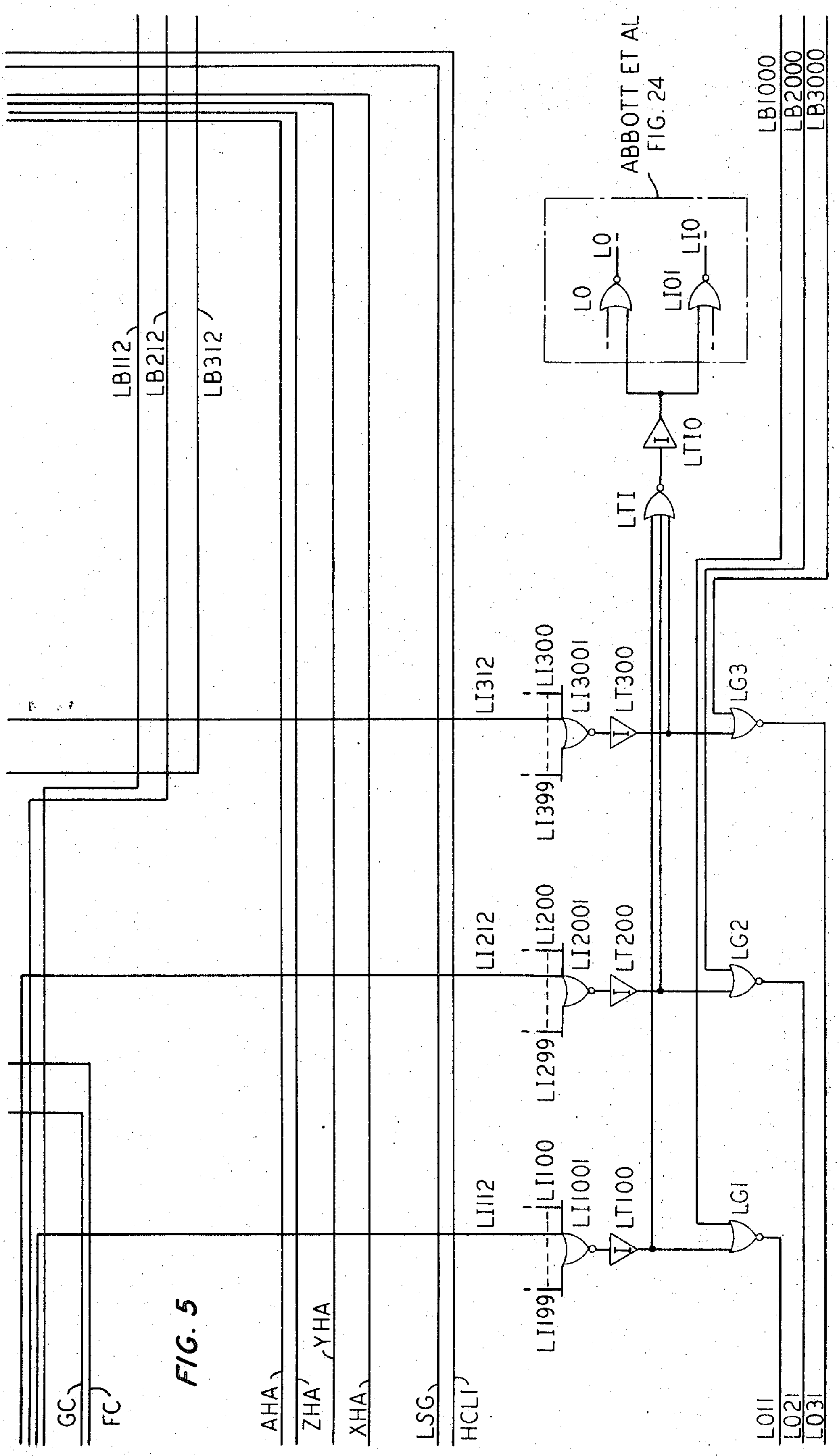
FIGS. 5 through 8, when arranged in accordance with FIG. 9, set forth the circuit details of the common control line scanning and control apparatus.

Referring now to FIG. 5 of the drawing, the high signal appearing on lead LI112 from line scanning group 100 enables OR gate LI1001 to place a low signal on the input of inverter gate LT100. The resulting high output signal from inverter LT100 enables OR gate LG1 to place a low signal on lead LO11 to supervisory circuit 20 and enables OR gate LT1 to operate inverter gate LT10 thereby placing high signals on inputs of OR gates LO and LIO1. The operation of these latter gates initiate the function sdescribed in detail in the aformentioned patent by Abbott et al. to place common control 1 of the switching system in the line dial tone LDT mode.

When common control 1 is placed in the LDT mode a high signal is placed on lead LDT, FIG. 7, to operate OR gate LSCA, and place low signals on the inputs of AND gate HCLO and inverter gates LSCC and LSCB. The resulting high signal output of gate LSCB enables inverter gate RSL to set the units counter of line scanner circuit, FIGS. 6 and 7, to the rest digit state thereby causing low signals to be applied to first inputs of AND gates CUL, BUL, AUL, YUL, and XUL. In addition, the high signal output of gate LSCB enables inverter gate LSG to place a low signal on lead LSG to operate these AND gates and place high signals on the corresponding inputs of noninverting OR gates CU, BU, AU, YU, and XU of code amplifier 30. In addition the low signal on lead LSG enables additional AND gates of code amplifier 30 that have low signal inputs from those ON positions of the tens counter of line scanner 40.

Referring again to FIG. 2 of the drawing, the high signals now appearing on any of the leads AT, XT, AU, and YU, extending from code amplifier 30, turn on transistor L1 of line circuit 112. With the turn on of transistor L1 a low signal is placed on lead LI112, via diodes D31, D41, and normal contacts of relay CO1, to inhibit operation of OR gate LI1001, FIG. 5, of common control 1. The resulting high output of gate LI1001 is propagated through logic gates LT100, LTI, and LTIO to appear as a low signal input to OR gate LO. OR gate LO turns off and, in the manner described by the aforementioned Abbott patent, enables the operation of the hunt control gate HCLO set forth in FIG. 7.

Operation of gate HCLO enables inverter gate HCL1 to control AND gate HCL and gate clock pulses from clock pulse generator 50 to advance the units digit counters of line circuit scanner 40 from the rest digit state. The high output signal of operated gate HCLO also appears on lead HCL1 extending to supervisory circuit 20, FIG. 3, and sets flip-flops FGA, FGB, and FGC to their set state. Subsequently, this high signal enables AND gate HCLG by means of timing capacitor CHCL1 and diode DHCL1 to place a low signal on one input of AND gates LOA, LOB, and LOC.

Clock pulses from clock pulse generator 50, FIGS. 6 and 7, advance line circuit scanner 40 to place high signals on the inputs of the noninverting OR gates of code amplifier 30 in accordance with the code format shown in the table of FIG. 10. From a study of the code of FIG. 10, it may be determined that at least one code lead connected to line circuits 112, 212, and 312 has a high signal thereon until line circuit scanner 40 advances to the tens digit 1 and the units digit 2 counting states. This high signal appearing on any code lead continues to hold the L1 transistor, FIGS. 2 and 4, of the calling line circuit 112 ON during the scanning interval. The high signals appearing on code leads AT, XT, AU, and YU have no effect on transistors L2 and L3 of line circuits 212 and 312 connected to on-hook stations since these transistors are currently held ON by the high signals appearing on the FB and FC bias leads.

When line circuit scanner 40, FIGS. 6 and 7, advances to the tens digit 1 and the units digit 2 counting state, tens digit positions A and X along with units digit positions A and Y are turned off thereby inhibiting connecting AND gates ATL, XTL, AUL, and YUL. The corresponding low signal outputs of these gates simultaneously inhibit noninverting OR gates AT, XT, AU, and YU and place low signals on code leads AT, XT, AU, and YU thereby removing the sole source of bias current for transistor L1, FIG. 2, of calling line circuit 112.

As a result, transistor L1 turns OFF and in the previously described manner places a high signal on lead LI112 to enable OR gate LI1001, FIG. 5, of common control 1. Operation of gate LI1001 results in the placing of a low signal on lead LO11 extending to AND gate LOA, FIG. 3, of supervisory circuit 20. With low signals appearing on both inputs AND gate LOA operates to place a high signal on the reset input of the FGA flip-flop.

The low signal of operated OR gate LI1001, FIG. 5, is applied as a high signal, via inverter LT100, OR gate LTI, and inverter LTIO, to the input of OR gate LO. The enabling of OR gate LO, as described in detail by the previously recited Abbott patent, inhibits operation of AND gate HCLO, FIG. 7, to place a low signal on lead HCL1. This low signal is inverted by gate HCL1 into a high signal on lead HCL to inhibit AND gate HCL and prevent further scanning operation of line circuit scanner 40. The low signal output of AND gate HCLO appearing on lead HCL1, unlocks the FGA, FGB, and FGC flip-flops, FIG. 3, and allows the high signal output of enabled AND gate LOA to reset flip-flop FGA to the "0" state. The high signal appearing at the "1" output of reset flip-flop FGA is applied as a locking signal to flip-flops FGC and FGB to prevent line circuit in line scanning groups 200 and 300 from resetting them at this time. Subsequently, capacitor CHCL1 discharges and inhibits gate HCLG to prevent further operation of AND gates LOA, LOB, and LOC. The resulting low signal "0" output of reset flip-flop FGA acts in combination with the low signal appearing on lead LSG to operate AND gate FGA and enable OR gates GC2 and GC3. Enablement of these gates place high signals, via connecting inverters GCB2 and GCC3, on bias leads GB and GC extending to line circuits 212 and 312, FIGS. 2 and 4. Since low signals appear on code leads AT, XT, AU, and YU the high signals now present on bias leads GB and GC prevent station operation of transistors L2 and L3 of line circuits 212 and 312 and thereby allows common control 1 to identify calling line circuit 112 from the concurrently scanned line circuits 112, 212, and 312.

A high signal appearing at the collector of turned-off transistor L1 is applied via diode D31, break contacts of relay CO1, and resistor R71 to the base of transistor LM1. Transistor LM1 is biased ON thereby operating relay LMR1 and causing signaling conductor C1 to be grounded through break contact of relay CO1 and make contact of relay LMR1 to switching network 2. This high signal is also connected to lead LI112 through diode D41 to enable OR gate LI1001, FIG. 5, to operate OR gate LIO1 and enable common control 1 to initiate the selection of register 4. Upon selection of idle register 4, a low signal is extended from register 4 over signal conductor S1 to operate the CO1 relay of line circuit 112. Operation of relay CO1 extends the T1 and R1 conductors from calling station 112 through make contacts CO1 and switching network 2 to reguster 4 which now supplies dial tone over these conductors to calling station 112. In addition, the operation of the CO1 relay in opening the connection to station T1 lead turns on transistor L1 under control of the high signal appearing on bias lead FA and transfers the resulting low signal output from signal lead LI112 to signal lead LB112. Common control 1 now releases from the connection and enters an idle status.

3. Read Register Request

Upon receipt of dial tone the calling subscriber located at station 112 proceeds to dial the called station number 312 into register 4. After the digits have been recorded and stored register 4 initiates a read register request in the well-known manner to common control 1. When common control 1 becomes idle it proceeds to honor the read register request by entering the read register RR mode and placing a high signal on the RR lead, FIG. 3, connected to the input of OR gate GC. The low output signal of enabled OR gate GC is inverted by gate GCR into a high signal to operate OR gates GC1, GC2, and GC3. Operation of these gates result in high signals appearing on the GA, GB, and GC bias leads to prevent the stations of the switching system from subsequently turning OFF the L-transistors of their connecting line circuits that are currently held ON by the high signals on bias leads FA, FB, and FC.

Register 4 reads the called station number 312 into common control 1 by gating low signals in the code format of FIG. 10 onto register read-out leads extending to the inputs of noninverting OR gates AH, ZH, AT, XT, AU, and YU of code amplifier 30. The resulting low signal outputs of gates AH and ZH are extended over connecting leads AHA and ZHA to supervisory circuit 20, FIG. 3, to enable AND gate H3. At this time inhiibited AND gates FGB and FGA, along with enabled OR gate FC have placed low signals on three of the four inputs of AND gate FC3. Thus, enablement of gage H3 places a low signal, via inverter gate RCOC, on the remaining input thereby enabling AND gate FC3 to place a low signal on the FC bias lead extending to all of the line circuits assigned to line scanning group 300.

The low signals, corresponding to dialed tens digit 1 and units digit 2 recorced in register 4, inhibit noninverting OR gates AT, XT, AU, and YU, FIGS. 6 and 7, to place low signals on code leads AT, XT, AU, and YU. These low signals act in combination with the low signal appearing on bias lead FC to remove the bias voltage from the base of transistor L3, FIG. 4, located in called line circuit 312. Since the high signals appearing on bias leads GA, FA, GB, and FB prevent transistors L1 and L2 from turning OFF at this time the turn ON of transistor L3 enables common control 1 to identify called line circuit 312 from calling and idle line circuits 112 and 212, respectively.

If called line circuit 312 is idle relay CO3 will be released and the high signal appearing on the collector of turned OFF transistor L3 is connected, via diode D33 and break contact of relay CO3, to the base of transistor LM3 and signal lead LI312. As a result transistor LM3 turns ON and operates relay LMR3 to connect a marking ground signal through break contact of relay CO3 and make contact of relay LMR3 to signaling conductor C3 extending to switching network 2.

The high signal connected to lead L1312 enables OR gate LI3001, FIG. 5, and connecting logic circuitry to enable OR gate LI01. In the manner described in detail by Abbott et al., common control 1 selects an idle intercom trunk 3 and establishes a connection from one appearance of the intercom trunk through switching network 2 to called line circuit 312. Subsequently, intercom trunk 3 places a low signal on lead S3, FIG. 4, to operate relay CO3 and connect called station 312 over conductors T3 and R3, through make contacts of relay CO3 to intercom trunk 3.

Figure 8:
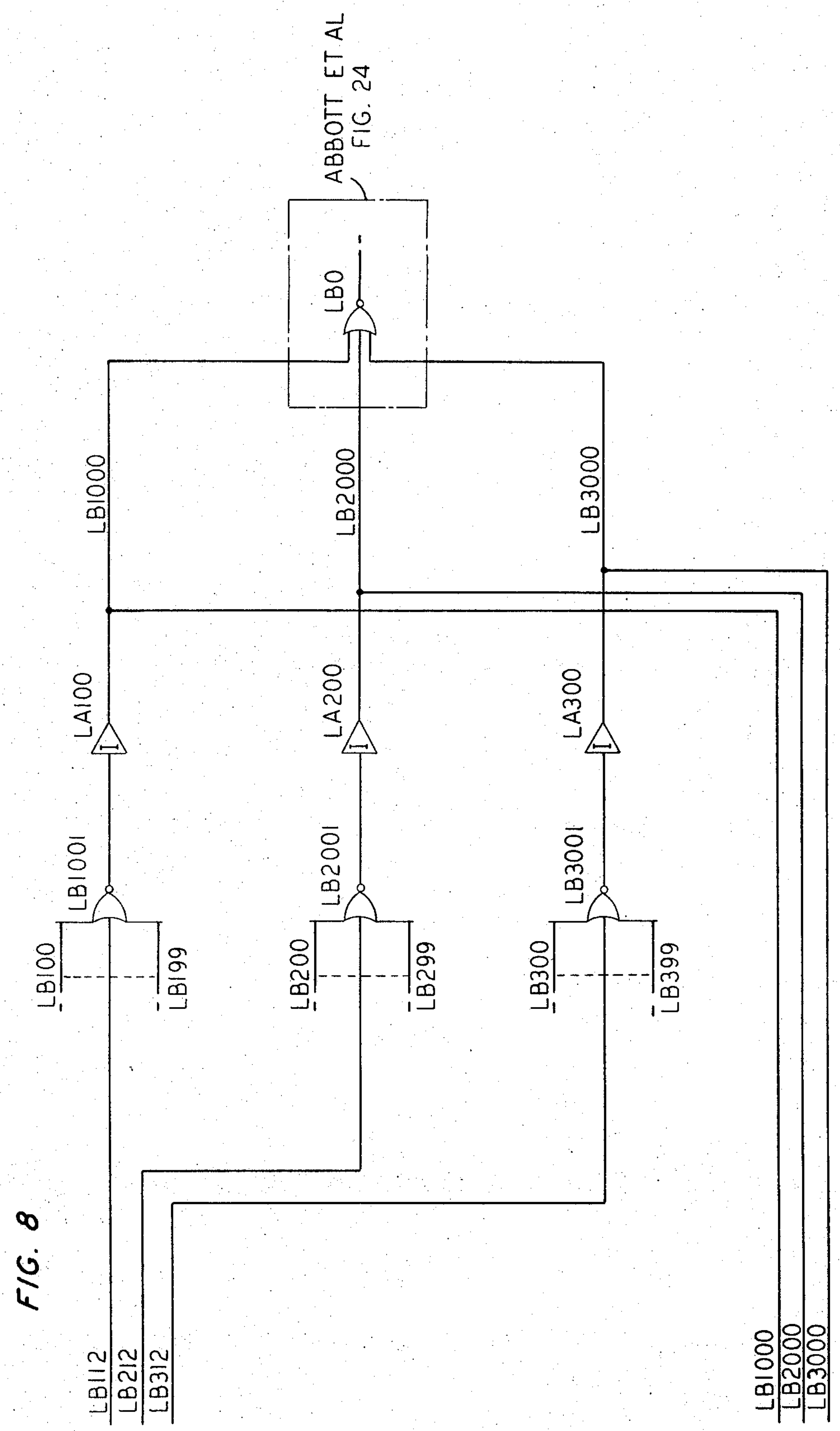

Operation of relay CO3 transfers the high output collector signal of turned OFF transistor L3 from lead LI312 to lead LB312 to enable OR gate LB3001, FIG. 8. The enablement of OR gate LB3001 connects a high signal, via inverter LA300, to OR gate LBO to signal common control 1 that called station 312 has been connected through line circuit 312 to intercom trunk 3. If called line circuit 312 is busy the CO3 relay would be operated and the resulting turn OFF of transistor L3 would be indicated by a high signal connected to lead LB312 instead of lead LI312. Common control 1 detects this high signal on lead LB312 and initiates the busy sequence detailed in the aforementioned Abbott patent to return a busy tone to the calling subscriber.

4. Call Back Sequence

Calling line circuit 112 cannot be immediately connected with the remaining appearance of intercom trunk 3 in that the calling line circuit is still connected to register 4. Since common control 1 serves other line circuit requests during the dialing interval it has no way of immediately identifying calling line circuit 112. When a called line circuit has been connected to an intercom trunk, common control 1 in the well-known manner signals register 4 to place a −24 volt signal on lead S1, FIGS. 2 and 4, extending through switching network 2 to calling line circuit 112. In addition, common control 1 places a low signal on the B input of OR gate FC, FIG. 3, to make lead FC high and inhibit operation of AND gates FC1, FC2, and FD3. The resulting low output signals of these gates are inverted into high signals appearing on bias leads FA, FB, and FC. Also at this time OR gate GC, FIG. 3, is inhibited in order that low signals may be placed on bias leads GA, GB, and GC. Common control 1 also directs register 4 to place low signals on the inputs of all noninverting OR gates of code amplifier 30, FIGS. 6 and 7, and further places a high signal on the CBL input of OR gate LSCA, FIG. 7. As earlier set forth, the enablement of gate LSCA resets line scanner 40 to the units counter rest state, gates the output of the reset line scanner 40 through code amplifier 30 onto the code leads, enables AND gate HCLO to start the line scanning process and sets flip-flops FGA, FGB, and FGC to the "1" state.

Referring not to FIGS. 2 and 4 of the drawing, the −24 volts appearing on lead S1 is extended through resistor R81 of calling line circuit 112 and diode D51 to place a low signal on terminal A1. Recalling that transistor L1 is presently in the ON state, the lowering of the potential of terminal A1 places transistor L1 under control of code leads AT, XT, AU, and YU. Since high signals are currently present on all of the FA, FB, and FC bias leads the transistors L- of idle and busy line circuits, such as line circuits 212 and 312, are maintained in the ON state. When line scanner 30 scans the tens digit 1 and the units digit 2 by placing low signals on code leads AT, XT, AU, and YU, transistor L1 turns OFF and places a high signal on lead LB 112, via diode D31 and make contacts of relay CO1.

A high signal appearing on lead LB112 enables OR gate LB1001, FIG. 8, to place a high signal, via inverter LA100 and lead LB1000, on an input of OR gate LG1, FIG. 5. OR gate LG1 operates in the previously described manner to reset flip-flop FGA, FIG. 3, and enable OR gates GC2 and GC3 to remove the low signals appearing on bias conductors GB and GC to effect an identity of calling line circuit 112. In addition, operation of gate LB1001, FIG. 8, enables gate LBO to direct common control 1 to disconnect register 4 from calling line circuit 112. During the disconnect sequence a high signal is placed on the QL input of OR gate FC, FIG. 3, to enable the inputs of AND gates FC1, FC2, and FC3 connected to lead FC. Similarly, low signals appearing on the register read-out leads enable AND gates H1, H2, and H3, via their respective inverters RCOA, RCOB, and RCOC, to place low signals on additional inputs of AND gates FC1, FC2, and FC3. These low signals, in combination with low signals on lead FC and the outputs of AND gates FGB and FGC, presently inhibited by set flip-flops FGB and FGC, enable gate FC1 to place a low signal on bias lead FA. Thus, when register 4 disconnects from calling line circuit 112, the low signal now appearing on bias lead FA prevents transistor L1, FIG. 2, from turning back ON when the −24 volt signal is removed from lead S1. The low signal appearing on lead FC, FIG. 3, is propagated through common control 1 as described in detail by the Abbott patent to inhibit AND gate HCLO and lock line circuit scanner 40 in its present position.

Disconection of register 4 from calling line circuit 112, together with the consequent removal of −24 volts from lead S1, releases relay CO1. The release of this relay closes break contacts to extend a marking signal from ground, through make contacts of relay LMR1, and over signaling conductor C1 to switching network 2.

Common control 1 now proceeds in the well-known manner to establish a connection between calling line circuit 112 and the remaining appearance of intercom trunk 3 through switching network 2. Upon completion of this connection intercom trunk 3 places a signal on lead S1 to reoperate relay CO1 and connect calling station 112 through make contacts of relay CO1, switching network 2, intercom trunk 3, and make contacts of relay CO3 to called station 312. Common control 1 now releases from the connection thereby leaving the subscriber located at calling station 112 free to converse with the subscriber answering called station 312.

SUMMARY

It is obvious from the foregoing that the facility, economy, and efficiency of electronic switching systems may be substantially enhanced by the provision of line supervisory apparatus arranged to locate and identify calling and called stations assigned to concurrently scanned groups of line circuits of the switching system. It is further obvious from the foregoing that the aforesaid line supervisory apparatus feature of selectively controlling the bias voltages of simultaneously scanned groups of line circuits allows the switching system to service an increased number of stations without appreciatively increasing call processing time.

While the apparatus of our invention has been disclosed in a specific telephone switching system, it is to be understood that such an embodiment is intended to be illustrative of the principles of our invention and that numerous other arrangements may be devised by those skilled in the art without departing from the spirit and scope of the invention.

We claim

1. In a switching system having a plurality of concurrently scanned line circuits, a supervisory circuit terminated in bias control conductors individual to each of the line circuits for use in conjunction with controller means to interconnect identified ones of the line circuits comprising means coupled to the bias control conductors for applying potentials to the conductors to normally maintain the line circuits in an idle state, and means responsive to the controller means for selectively enabling said applying means to rearrange said application of the potentials to the conductors to effect an identity of calling and called ones of the plurality of concurrently scanned line circuits.

2. The supervisory circuit set forth in claim 1 wherein said selectively enabling means comprises means controlled by the controller means for locating a calling one of the line circuits by selectively directing said applying means to remove one of the potentials from first ones of the conductors individual to other ones of the concurrently scanned line circuits.

3. The supervisory circuit set forth in claim 2 wherein said sleectively enabling means further comprises means selectively controlled by the controller means for identifying a called one of the concurrently scanned line circuits by directing said applying means to remove the potentials from the conductors individual to the called line circuit.

4. The supervisory circuit set forth in claim 3 wherein said identifying means comprises means connected to the controller means for causing first ones of said applying means to remove said one potential from the first conductors individual to each of the concurrently scanned line circuits, and means for selectively directing second ones of said applying means to remove another one of the potentials from a second one of said conductors individual to the called line circuit.

5. In a switching system having a plurality of concurrently scanned line circuits, a supervisory circuit terminated in pairs of bias control conductors connected to each of the line circuits for use in conjunction woth a controller to interconnect identified calling and called ones of the line circuits comprising first means coupled to ones of the pair conductors for normally applying a first potential to the line circuits, second means coupled to others of the pair conductors for normally applying a second potential to the line circuits, means controlled by the controller for selectively directing ones of said first means to remove the first potential from said one conductors connected to idle and interconnected ones of the concurrently scanned line circuits to effect an identity of the calling ones of the line circuits, means connected to the controller for causing said first means to remove the first potential from said one conductors connected to the plurality of concurrently scanned line circuits, and means enabled by the calling line circuits in combination with the controller for selectively enabling ones of said second means to remove the second potential from ones of said other conductors connected to one of the concurrently scanned line circuits to effect an identity of the called ones of the line circuits.

6. The supervisory circuit set forth in claim 5 wherein said directing means comprises binary means having first states for indicating idle conditions of the line circuits and a second state for indicating a calling condition of one of the lIne circuits, said binary means interconnected so that one of said binary means being in said second state causes all others of the binary means to assume said first states.

7. The supervisory circuit set forth in claim 6 wherein said directing means further comprises first logic gates coupled to the controller and responsive to the calling ones of the line circuits for resetting said binary means to the second state, and second logic gates coupled to the controller and enabled by said reset binary means for connecting a first enabling signal to ones of said first means and a first input signal to said second means.

8. The supervisory circuit set forth in claim 7 wherein said causing means comprises a control path including an inverter gate for connecting a second enabling signal to said first means.

9. The supervisory circuit set forth in claim 8 wherein said selectively enabling means comprises a first lead coupled to the controller for connecting a second input signal to said second means, and third logic gates coupled to the controller for selectively connecting a third input signal to ones of said second means.

10. The supervisory circuit set forth in claim 9 wherein said first means includes a plurality of buffer gates each controlled by said first and said second enabling signals and wherein said second means includes a plurality of coincident gates each controlled by the combination of said first, second, and third input signals.

11. In a telephone switching system having a plurality of concurrently scanned line circuits connected to telephones and a controller for interconnecting calling and called ones of the telephones, a supervisory circuit for identifying ones of the line circuits connected to the calling and called telephones by selectively rearranging potentials applied to pairs of bias conductors terminated in each of the scanned line circuits comprising buffer gates responsive to first and second enabling signals for removing one of the potentials normally applied to a first one of the bias pair conductors, coincident gates responsive to a combination of first, second, and third input signals for removing another of the potentials normally applied to a second one of said bias pair conductors, binary elements each having a first state for indicating an idle condition of one of the line circuits and a secnd state for indicating a calling condition of the one line circuit, each of said binary elements interconnected so that one of said binary elements being in said second state causes all other of the binary elements to assume said first state, first logic gates enabled by the controller and responsive to ones of the line circuits connected to the calling telephones for resetting one of said binary elements to said second state, second logic gates enabled by the controller and responsive to each of said binary elements for connecting said first input signals to predetermined ones of said coincident gates and said first enabling signals to predetermined ones of said buffer gates associated with ones of the line circuits connected to idle and interconnected ones of the telephones, third logic gates selectively enabled by the controller and responsive to dialing signals generated by the calling telephones for connecting said second input signal to ones of said coincident gates associated with ones of line circuits connected to the called telephones, a first control lead coupled via an inverter gate to said buffer gates for connecting said second enabling signal generated by the controller to said buffer gates, and a second control lead coupled to said coincident gates for connecting said third input signal generated by the controller to said coincident gates.

12. In a telephone switching system a plurality of telephones, a plurality of line circuits individually coupled to said telephones and each assigned to one of a plurality of line scanning groups, a pair of bias conductors individual to each of the line scanning groups and connected to every one of the line circuits assigned to the line scanning group, a line scanner for sequentially generating code scanning signals signifying ones of the line circuits assigned to each of the line scanning groups, means for concurrently connecting the scanning signals to said signified line circuits, and a controller for interconnecting calling and called ones of the telephones connected to said concurrently scanned line circuits, and a line supervisory circuit for enabling said controller to effect an identity of ones of said concurrently scanned line circuits connected to the calling and called telephones comprising gate means connected to said pairs of bias conductors for applying potentials to the conductors to normally maintain the line circuits in an idle state, first logic means for enabling said scanner to locate said ones of the line circuits connected to the calling telephones in ones of the line scanning groups by selectively enabling said gate means to remove one of the potentials from ones of the bias conductors individual to others of the line scanning groups, and second logic means for enabling said scanning signal connecting means to locate said ones of the line circuits connected to the called telephones in ones of the line scanning groups by selectively enabling said gate means to remove the potentials from the pair of conductors individual to said ones of the line scanning groups.

13. In a switching system wherein subscriber station line circuits are arranged in groups and corresponding line circuits in said groups are simultaneously scanned, first bias leads normally having a bias thereon, second bias leads normally having a bias thereon, one of said first and one of said second bias leads being connected to all of the line circuits in each of said groups, and a supervisory circuit including first means for removing the bias from one of said first bias leads to identify a calling subscriber station in one of said groups as all of said groups are simultaneously scanned and second means for removing the biases from the first and second bais leads to one of said groups to identify a called subscriber station in one of said groups as all of said groups are simultaneously scanned.

* * * * *